W. CAMPBELL.
INTERNAL COMBUSTION ENGINE.
APPLICATION FILED SEPT. 18, 1911.
1,091,629.
Patented Mar. 31, 1914.
2 SHEETS—SHEET 2.
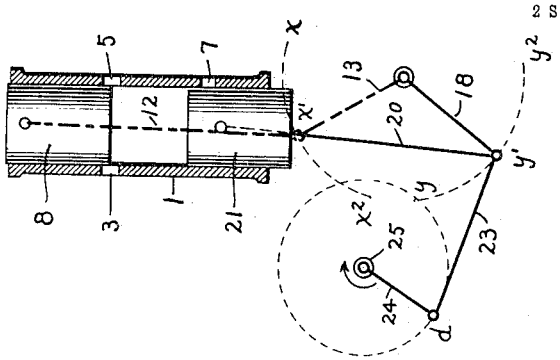
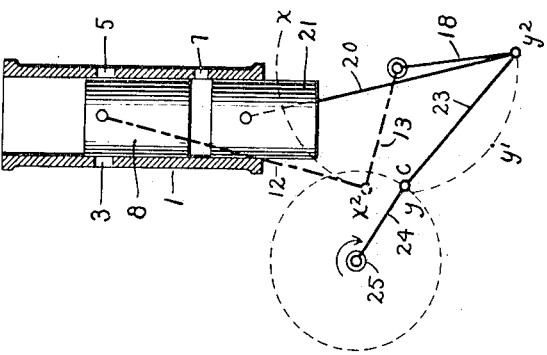
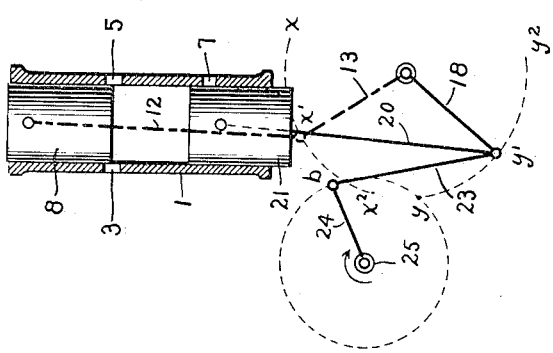
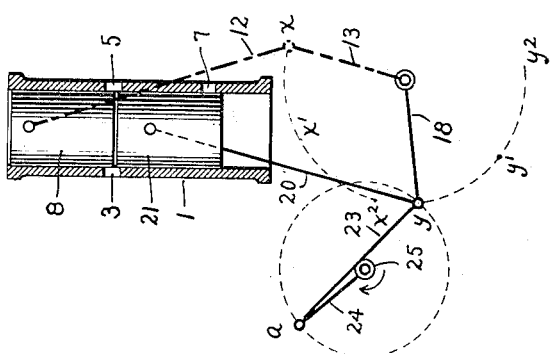
Witnesses:
Inventor:
Wilfred Campbell,
by
His Attorney.

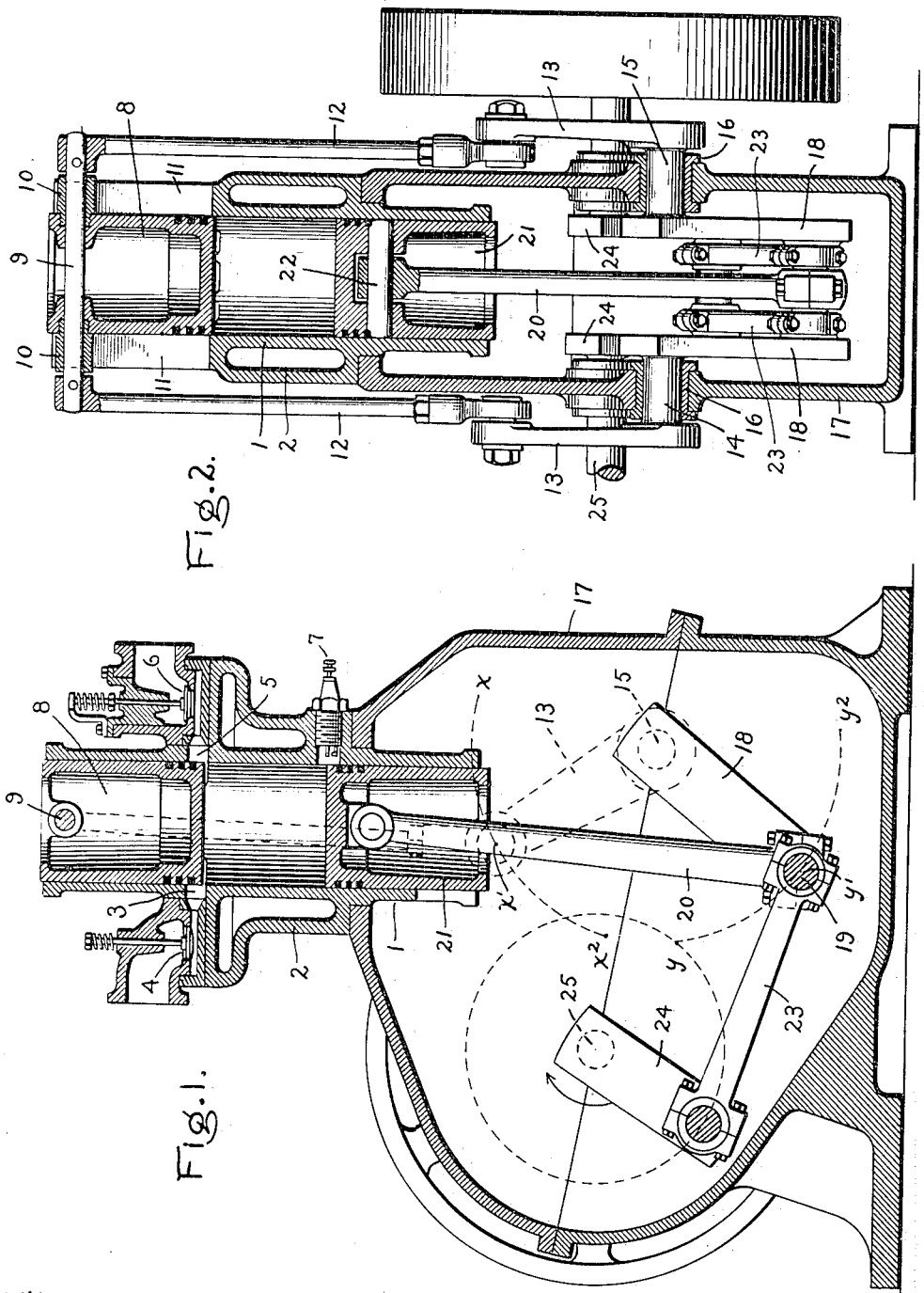

UNITED STATES PATENT OFFICE.

WILFRED CAMPBELL, OF SCHENECTADY, NEW YORK, ASSIGNOR TO GENERAL ELECTRIC COMPANY, A CORPORATION OF NEW YORK.

INTERNAL-COMBUSTION ENGINE.

1,091,629. Specification of Letters Patent. Patented Mar. 31, 1914.

Application filed September 18, 1911. Serial No. 849,912.

*To all whom it may concern:*

Be it known that I, WILFRED CAMPBELL, a subject of the King of Great Britain, residing at Schenectady, in the county of Schenectady, State of New York, have invented certain new and useful Improvements in Internal-Combustion Engines, of which the following is a specification.

This invention relates to internal combustion engines.

While not limiting the invention to any particular type of engine, it will be described as applied to an engine of the four cycle type in which it is possible to secure an explosion at each revolution of the shaft, to do away with valve-actuating gearing, to avoid exposing the valves to the pressures developed by the explosion of the charge, to effect a good compression, to secure a complete scavenging, and to obtain a long throw of the crank with a short stroke of the piston. To accomplish these desirable results, I use two pistons in the same cylinder, connected with the crank shaft by an improved system of rods and rock-arms or cranks having a small number of parts adapted to efficiently transmit the forces to which they are subjected, whereby one piston effects the suction of the charge at a relatively slow rate, and the scavenging of the cylinder, the other piston serving to compress the charge at a relatively rapid rate and execute the power stroke. The valves are held closed by springs, one valve opening in response to the suction stroke to admit the explosive charge, and the other opening during the scavenging stroke to permit the gases to escape. The compression and firing of the charge take place in a part of the cylinder remote from the ports through which the gas enters and leaves the cylinder, so that the valves are not exposed to the high working pressure.

In the accompanying drawings, Figure 1 is a vertical section of an upright engine embodying my invention, Fig. 2 is a section at right angles to Fig. 1, and Figs. 3, 4, 5, and 6 are diagrams illustrating the cycle of operation.

The cylinder 1 is open at each end and its length is almost three times the stroke. The middle portion of the cylinder constitutes the working chamber for the compression and explosion of the charge, and is provided with a water jacket 2. At the upper end of this chamber is an inlet port 3 preferably controlled by a spring-seated inwardly-opening valve 4. Opposite the port 3 and at the same level is the exhaust port 5 preferably controlled by a spring-seated outwardly-opening valve 6. At the lower end of the working chamber is located the spark plug 7 for igniting the charge but the invention is not limited to an engine in which the ignition is produced in this particular manner. In each end of the cylinder is a trunk piston. The upper piston 8 is the power piston and has a long transverse pin 9 at its upper end whose ends carry slide-blocks 10, which reciprocate in guide-slots 11 cut longitudinally in the upper walls of the cylinder. The ends of the pin project beyond the blocks and form trunnions for two links or connecting rods 12 whose lower ends are pivoted to rock-arms or cranks 13 on a rocking crank shaft 14 and 15, suitably journaled in bearings 16 in the walls of the crank case 17 of the engine. On the inner portion of said shaft, inside the crank case, are the rock-arms or cranks 18 which are connected by a wrist pin 19 to which is pivoted the pitman 20 attached to the lower piston 21 by the trunnion pin 22. The wrist pin 19 is connected by one or two connecting rods 23 with a crank 24 on the engine shaft 25. The arms 13 and 18 are of longer radius than the crank 24, so that they have a limited arc of oscillation, while the crank is making a complete revolution.

The operation can be understood best from the diagrams Figs. 3 to 6. With the crank 24 on the upper dead center at $a$ the pistons are close together, with their adjacent faces on the level of the ports 3 and 5, as shown in Fig. 3. A quarter revolution of the crank 24 in the direction of the arrow brings it to position $b$, Fig. 4. The upper ends of the rock-arms 13 have swung over in an arc $x\ x'$ whose chord is substantially horizontal, the upper piston 8 lifting slightly and then returning about to its former position. The rock-arms 18, however, have swung downward on the arc $y\ y'$ pulling down the lower piston 21 and causing it to draw in a charge of explosive through the port 3, whose valve opens automatically to admit it. During the next quarter revolution of the crank, to the position $c$, Fig. 5, the rock-arms 13 swing downwardly in an arc $x'\ x^2$ whose chord is more nearly upright, so that the links 12 pull down the upper piston 8. Meanwhile, the arms 18 have moved through an arc $y'$ $y^2$ which is almost horizontal, so that the lower piston 21 has moved but slightly from the position it occupied in Fig. 4, dropping just below the spark plug 7. During this change in positions, the piston 8, therefore, approaches the piston 21, and compresses the charge between them. Just before the crank reaches the lower dead center the charge is ignited by the spark plug. The expansion of the gas drives up the upper piston 8 to the position shown in Fig. 6, exerting a pull on the links 12 and a thrust on the rods 23 and causing the crank to move to position $d$ and exert a driving torque on the shaft 25. Meanwhile, the arms 18 swing back along the arc $y^2$ $y'$ slightly lifting the lower piston. The continued movement of the crank to its original position $a$ carries the arms 18 up along the arc $y'$ $y$ and lifts the piston 21 to the level of the ports 3 and 5, expelling the burned gases through the port 5, whose valve is forced open by the pressure exerted by said gases. During this last quarter revolution, the arms 13 describe the arc $x'$ $x$, so that the upper piston remains practically stationary. The engine illustrated, therefore, operates on the four-cycle principle, but all four steps of the cycle are performed in one revolution of the crank shaft, which thus receives a driving impulse once in each revolution, instead of once in two revolutions, as is ordinarily the case in four-cycle engines. Moreover, the compression and explosion of the charge occur at the lower part of the cylinder, entirely removed from the ports 3 and 5, and the valves 4 and 6, which are subjected only to the pressure and temperature of the exhaust. Owing to the relative positions of the arms 13 and 18 and the crank 24 at the instant the charge is ignited, the piston 8 can exert its power most advantageously. (See Fig. 5.)

It will be observed that the pistons operate alternately, the lower one making an instroke and an outstroke while the upper one is stationary, and then remaining stationary while the upper one makes an instroke and an outstroke.

It will also be observed that the upper piston coöperates with the inlet and exhaust ports in the same manner as the piston of a two-cycle engine, closing them after the charge has been drawn in and keeping them closed during compression and ignition, and then opening them for the discharge of the burnt gases through the exhaust port and the intake of a fresh charge.

While I have illustrated the invention as applied to an upright engine, it is evident that whether the cylinder is vertical or horizontal is immaterial. Furthermore, the cylinder may be air cooled instead of water cooled, if desired.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. An internal combustion engine having a cylinder and two pistons therein, an engine crank shaft, and a connection between the pistons and the engine shaft, comprising a second crank-shaft, cranks on said second crank shaft at such an angle to each other that when one is moving about an arc, the chord of which is substantially horizontal, the other is moving about an arc, the chord of which is substantially vertical, means connecting the two pistons to the cranks, and a connection between the two crank-shafts.

2. An internal combustion engine having a cylinder and two pistons therein, an engine crank-shaft, and a connection between the pistons and the engine shaft comprising a second crank-shaft parallel to the engine shaft provided with a plurality of cranks, means connecting the two pistons to the cranks of the second shaft, the cranks to which the pistons are respectively connected being arranged at an angle to each other, and means connecting the two crank-shafts.

3. An internal combustion engine having a cylinder and two pistons therein, a rotating engine crank-shaft arranged at one side of the axis of the cylinder, and connections between the pistons and the engine shaft comprising a rocking crank-shaft arranged on the opposite side of the axis of the cylinder and parallel to the engine shaft, the axis of one shaft being nearer the cylinder than the other, means connecting the two pistons to the cranks of the rocking shaft, the cranks to which the pistons are respectively connected being arranged at an angle to each other, and means connecting the two crank-shafts.

4. An internal combustion engine, having a cylinder containing inlet and exhaust ports, two pistons in said cylinder, a rock-arm one end of which moves about a given axis in an arc which at first lies transverse to the axis of the cylinder and is subsequently more nearly parallel therewith, a second rock-arm one end of which moves about the same axis in an arc which at first is substantially parallel with the axis of the cylinder and is subsequently more nearly transverse thereto, members connecting said rock-arms respectively with said pistons, and a crank shaft operatively connected with one of said arms.

5. An internal combustion engine having a cylinder and two pistons therein, a rotating engine crank-shaft, and a connection between the pistons and the engine shaft comprising a rocking crank-shaft parallel to the engine shaft, outside connecting rods connecting one piston to the rocking shaft, an inside connecting rod connecting the other piston to the rocking shaft, the cranks to which the two pistons are connected being arranged at an angle to each other, and a connection from one of said cranks to the engine shaft.

6. An internal combustion engine having a cylinder and two pistons therein, a rotating engine crank-shaft, a rocking crank-shaft located at one side of the axis of the cylinder with its axis parallel to the axis of the first shaft and having a plurality of cranks of greater length than the crank radius of the engine shaft, a connection between the two crank-shafts, and connections between the pistons and the cranks of the rocking shaft, the cranks to which the pistons are respectively connected being arranged on opposite sides of the axis of said shaft and at such an angle to each other that when one is moving about an arc, the chord of which is substantially horizontal, the other is moving about an arc, the chord of which is substantially vertical.

7. An internal combustion engine, having an upright cylinder open at both ends, longitudinal slots in the upper portion thereof, two pistons in the cylinder, the upper one having a transverse pivot pin extending out through said slots, a crank case having axially alined rock-shafts in the sides thereof, outer rock-arms on said shafts, links connecting said arms with said pivot pin, inner rock-arms on said shafts connected by a wrist pin, a pitman connecting said wrist pin with the lower piston, a crank shaft and crank, and a connecting rod between said crank and said wrist pin.

In witness whereof, I have hereunto set my hand this 16th day of September 1911.

WILFRED CAMPBELL.

Witnesses:
HELEN ORFORD,
T. J. SEABOLT.